June 9, 1942.   M. A. CARMODY   2,286,166
AUTOMATIC COUPLING MEANS FOR TRACTOR-SEMI-TRAILER COMBINATION
Filed July 2, 1940   2 Sheets-Sheet 1

INVENTOR
MICHAEL A. CARMODY
BY
Beau, Brooks, Buckley & Beau.
ATTORNEYS

June 9, 1942.  M. A. CARMODY  2,286,166
AUTOMATIC COUPLING MEANS FOR TRACTOR-SEMI-TRAILER COMBINATION
Filed July 2, 1940  2 Sheets-Sheet 2
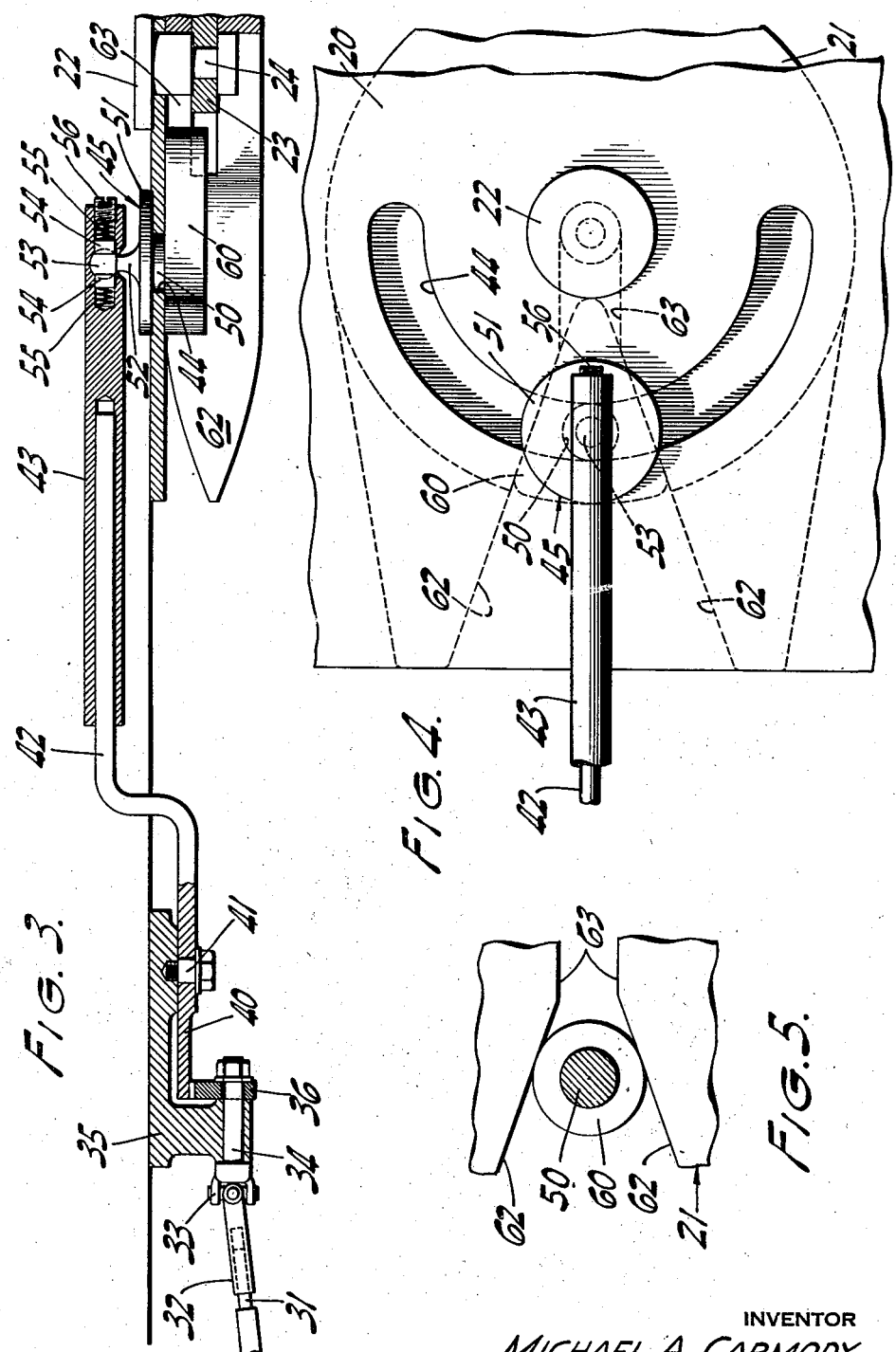
INVENTOR
MICHAEL A. CARMODY
BY
Beau, Brooks, Buckley & Beau.
ATTORNEYS Patented June 9, 1942

2,286,166

UNITED STATES PATENT OFFICE 2,286,166

AUTOMATIC COUPLING MEANS FOR TRACTOR-SEMITRAILER COMBINATIONS

Michael A. Carmody, Buffalo, N. Y., assignor of one-half to Henry Schaefer, Jr., Buffalo, N. Y.

Application July 2, 1940, Serial No. 343,625

7 Claims. (Cl. 280—33.55)

My invention relates in general to tractor-semi-trailer combinations having means for steering the trailer part of the combination, and more particularly to automatic coupling means for such steering mechanism.

It is well known to those skilled in the art that in tractor-semi-trailer combinations it is necessary that the coupling and uncoupling of the two parts of such combination be accomplished preferably from the driver's seat. When the semi-trailer part of such combination is provided with steering means, it is desirable that such steering means be automatically coupled when the power unit and tractor unit are coupled.

The principal object of my invention has been, therefore, to provide coupling means for the steering mechanism of tractor-semi-trailer combinations which shall be automatically coupled or uncoupled when the two parts of the combination are coupled or uncoupled.

Another object has been to provide coupling means which shall be simple in design and durable in operation and which shall not very materially alter the general construction of the tractor combination.

Moreover, it has been an object to mount the coupling means upon the upper fifth wheel of the combination and to utilize the V-shaped mouth of the standard lower fifth wheel to centralize and couple the steering mechanism with the power unit of the combination.

Furthermore, my device is of such a nature that when once coupled it cannot become detached so long as the kingpin of the combination is in engagement with the fifth wheel parts.

The above objects and advantages have been accomplished by the device shown in the accompanying drawings, of which:

Fig. 3 is an enlarged, fragmentary, side elevation of the invention taken on line 3—3 of Fig. 2.

Fig. 4 is an enlarged, fragmentary, plan view thereof.

Fig. 5 is a fragmentary, plan view of a modified form of invention.

Figure 1:
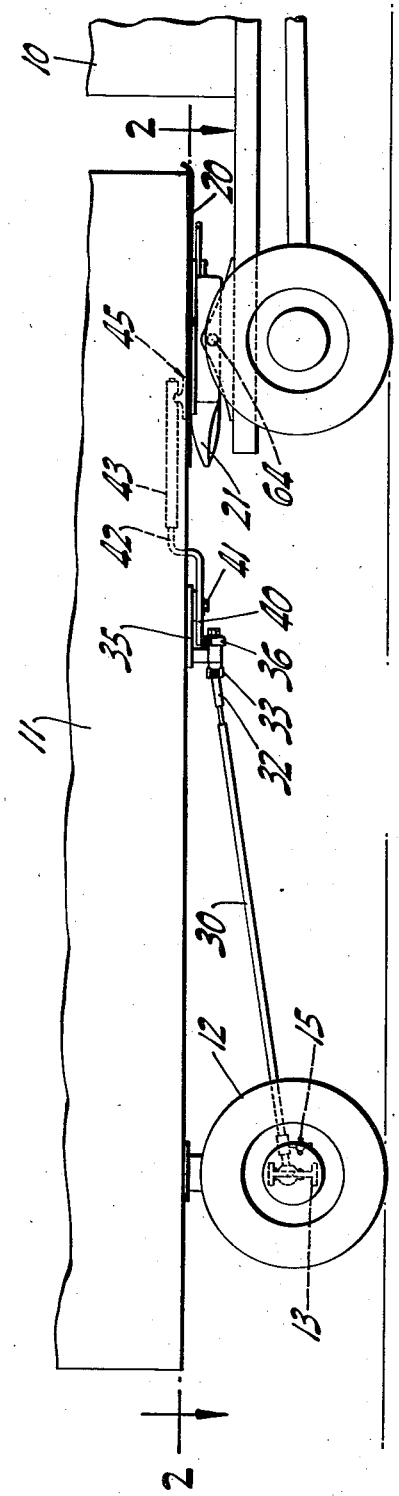
Fig. 1 is a fragmentary, side elevation of a tractor-semi-trailer combination showing my invention as applied thereto.
Figure 2:
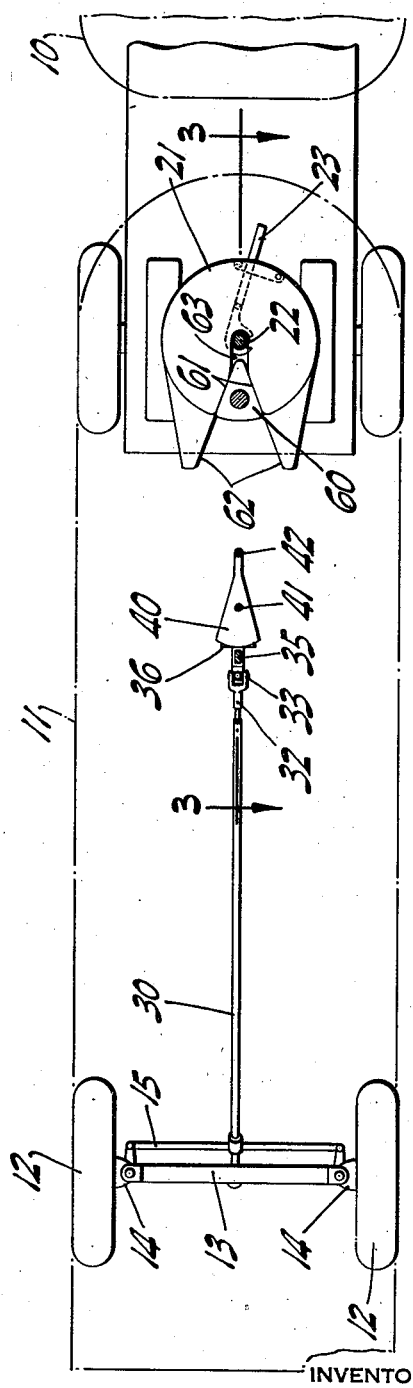
Fig. 2 is a fragmentary, plan view of the same taken on line 2—2 of Fig. 1.

In the drawings, 10 represents the power unit of the combination and 11 the tractor unit thereof. As is customary in tractor-semi-trailer combinations, the tractor unit is supported at its rear end upon wheels or ground-engaging supports 12. These wheels are carried by the axle 13 of the chassis and are mounted upon steering knuckles 14 which are connected together by means of a connecting link 15 in customary manner, whereby the rear end of the tractor unit may be steered as hereinafter set forth.

The forward end of the trailer unit is provided with an upper fifth wheel 20 which is supported upon the lower fifth wheel 21 of the power unit, the two parts being operatively coupled by means of the usual kingpin 22. This kingpin, as is customary, is held in place by means of a kingpin latch 23 of standard design which engages with a groove 24 formed in the kingpin.

The trailer unit is provided with a steering shaft 30 which has its rear end suitably supported in rotatable manner preferably by means of the axle 13, and it is connected by suitable operating means to the connecting link 15 of the steering mechanism of the unit, whereby when the steering shaft is rotated in either direction, it will cause the connecting link to be reciprocated and thereby steer the wheels 12 of the vehicle. The forward end of the steering shaft is provided with a reduced end 31 which is slidably mounted within a sleeve 32. The connection between the reduced end of the shaft and the sleeve is preferably of a splined nature so as to cause unison rotation while permitting axial movement between the two parts. The sleeve is connected to a universal joint 33 which is carried by a gear shaft 34. The gear shaft is rotatably mounted in a gear bracket 35 carried preferably on the under side of the chassis of the tractor unit. The gear shaft carries a steering gear 36 with which the teeth of a segmental gear 40 are engageable. The segmental gear is rotatably mounted upon a pivot bolt 41 which is secured to the bracket 35.

The segmental gear 40 is carried by or forms an integral part of a steering lever 42 which extends forwardly from the bracket 35 and has a steering arm 43 slidably mounted upon its forward end. In carrying out my invention, the upper fifth wheel 20 has an arcuate slot 44 formed therein, which is struck from the axis of the kingpin 22. The steering member 45 of my device is slidably mounted within this slot and is held thereby against radial movement with respect to the kingpin when the parts are assembled. This steering member comprises a cylindrical portion 50 which is disposed within the slot 44 and a flange 51 arranged on top of the upper fifth wheel 20. Extending upwardly from the flange 51 is a stem 52 having a ball 53 at its upper end. This ball is rotatably attached to the forward end of the steering arm 43 preferably by shock absorbing means which may comprise semi-spherical discs 54, arranged one on each side of the ball 53, spring-pressed by means of helical springs 55. A screw 56 carried in the outer end of the steering arm provides means for adjusting the tension upon the discs. The steering member is also provided with a coupling element 60 which is located below the cylindrical part 50 thereof. This coupling element is arranged immediately below the upper fifth wheel 20 and may be either of wedge-shape formation or of cylindrical form, as shown in Fig. 5. Since the steering member 45 carrying the coupling element is maintained in definite radial relation to the kingpin by the arcuate slot 44, the coupling element will be non-slidably engaged with the kingpin slot when the parts are assembled. When wedge-shape in form, the coupling element has its side faces 61 made to conform to the inclined surfaces 62 of the mouth of the lower fifth wheel. As is well known, the lower fifth wheel 21 is mounted upon suitable trunnion bearings 64 carried by the power unit. The wedge extends inwardly preferably beyond the point where the wedge surfaces 62 of the mouth join the kingpin slot 63, whereby it more readily guides the coupling member into the mouth of the lower fifth wheel when the parts of the tractor-semi-trailer combination are being assembled.

From the foregoing it will be obvious that as the power unit 10 is backed up in the act of coupling it to the trailer unit 11, the open mouth of the lower fifth wheel will straddle the kingpin 22 and guide the kingpin into its slot 63 where it will be latched, in well known manner, by means of the latching mechanism 23. It is, of course, assumed that the power unit is lined up with the trailer unit before it is backed up to bring about the coupling just described, and for this reason the coupling element 60 will also be guided into the open mouth of the lower fifth wheel until either of its surfaces 61 contact with either surface 62 if the parts are not in perfect alignment. As the power unit is being moved backwardly, the open mouth is moved along the wedge 60 until, when the kingpin 20 has reached its final position, the wedge 60 will have been moved up into the mouth of the lower fifth wheel where its surfaces 61 will snugly engage the surfaces 62 of said mouth, thereby firmly holding the wedge in place. When the lower fifth wheel is now rotated by the relative turning movement of the power unit, the steering member 45 will be moved around in an arcuate path, guided by the cylindrical portion 50 of said member which will move through the slot 44 in the upper fifth wheel 20. The steering member is always in engagement with the arcuate slot 44 of the upper fifth wheel, where it will be held in readiness to bring about the coupling just described. Since the power unit, when being detached from the trailer unit, is usually moved straight forwardly, the steering member with its wedge-shaped coupling element 60 will usually be occupying a central position in the slot 44 where it will be frictionally held until the power unit is again to be attached to the tractor unit.

It will also be obvious from the foregoing that when the power unit is rotated as in steering, the arcuate movement imparted to the steering member 45 will cause the steering lever to be oscillated in either direction, depending upon the direction of steering, which will cause the segmental gear 40 to be oscillated in the opposite direction. The intermeshing steering gear 36 will thus cause the gear shaft to be rotated which, in turn, will cause the steering shaft to be rotated and thereby steer the rear wheels 12 of the trailer unit. The telescoped arrangement of the steering arm upon the steering lever compensates for the angular movement of the forward end of the steering arm during the steering action just described.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. In a tractor-semi-trailer combination, including an upper and a lower fifth wheel incorporating pivotal coupling elements therebetween, said lower fifth wheel being formed with a radial slot, said upper fifth wheel being formed with an arcuate slot substantially concentric with said coupling elements, ground-engaging supports for said trailer, means interconnecting said supports for steering, means to steer said supports as said tractor assumes an angle with respect to said semi-trailer, said steering means including a shaft connected to and extending forwardly from the steering means, a steering member slidably mounted in the arcuate slot of said upper fifth wheel and held thereby against axial movement, said member having a steering element for engagement with the slot of said lower fifth wheel, said element being maintained in the slot of said lower fifth wheel against radial movement with respect to said coupling elements, a telescopic steering arm connected adjacent one of its ends to said steering member and pivotally connected to said trailer adjacent its other end, and means interconnecting said shaft and said arm so constructed and arranged that the trailer supports are turned in a direction opposite to that assumed by the tractor.

2. In a tractor-semi-trailer combination, including an upper and a lower fifth wheel incorporating pivotal coupling elements therebetween, said lower fifth wheel being formed with a radial slot, said upper fifth wheel being formed with an arcuate slot substantially concentric with said coupling elements, ground-engaging wheels for said trailer, means interconnecting said wheels for steering, means to steer said wheels as said tractor assumes an angle with respect to said semi-trailer, said steering means including a shaft connected to and extending forwardly from the steering means, a steering member slidably mounted in the arcuate slot of said upper fifth wheel and held against axial movement, said member having a coupling ball at its upper end and a steering element at its lower end, said steering element being engageable with the slot of said lower fifth wheel, said element being maintained in the slot of said lower fifth wheel against radial movement with respect to said coupling elements, a telescopic steering arm connected adjacent one of its ends to said steering member and pivotally connected to said trailer adjacent its other end, and means interconnecting said shaft and said arm so constructed and arranged that the trailer supports are turned in a direction opposite to that assumed by the tractor.

3. In a tractor-semi-trailer combination, including an upper and a lower fifth wheel incorporating a kingpin carried by said upper fifth wheel and engageable with a radial kingpin slot formed in said lower fifth wheel, said upper fifth wheel being formed with an arcuate slot substantially concentric with said kingpin, wheels supporting said trailer, means interconnecting said wheels for steering, means to steer said wheels as said tractor assumes an angle with respect to said semi-trailer, said steering means including a shaft connected to and extending forwardly from the steering means, a steering member slidably mounted in the arcuate slot of said upper fifth wheel and maintained against axial movement therewith, said member having a steering element for engagement with the kingpin slot of said lower fifth wheel, said element being maintained in the slot of said lower fifth wheel against radial movement with respect to said kingpin, a telescopic steering arm connected adjacent one of its ends to said steering member and pivotally connected to said trailer adjacent its other end, and means ininterconnecting said shaft and said arm so constructed and arranged that the trailer wheels are turned in a direction opposite to that assumed by the tractor.

4. In a tractor-semi-trailer combination, including an upper and a lower fifth wheel incorporating a kingpin carried by said upper fifth wheel, said upper fifth wheel being formed with an arcuate slot substantially concentric with said kingpin, said lower fifth wheel having a kingpin slot terminating in an outwardly flaring mouth, wheels supporting said trailer, means interconnecting said wheels for steering, means to steer said wheels as said tractor assumes an angle with respect to said semi-trailer, said steering means including a shaft connected to and extending forwardly from the steering means, a steering member slidably mounted in the arcuate slot of said upper fifth wheel and maintained against axial movement therewith, said member having a substantially V-shaped steering element for engagement with the flaring mouth of the kingpin slot of said lower fifth wheel, said element being maintained in the slot of said lower fifth wheel against radial movement with respect to said kingpin, a telescopic steering arm connected adjacent one of its ends to said steering member and pivotally connected to said trailer adjacent its other end, and means interconnecting said shaft and said arm so constructed and arranged that the trailer wheels are turned in a direction opposite to that assumed by the tractor.

5. In a tractor-semi-trailer combination, including an upper fifth wheel, a lower fifth wheel incorporating pivotal coupling elements therebetween, one of said elements being permanently carried by said upper fifth wheel and engageable with a mating complementary element in said lower fifth wheel upon relative longitudinal movement of said fifth wheels, ground-engaging supports for said trailer, means interconnecting said supports for steering, means to steer said supports as said tractor assumes an angle with respect to said semi-trailer, said steering means including a shaft connected to and extending forwardly from the steering means, a steering member pivotally carried by said upper fifth wheel at a point removed from the vertical axis of the complementary coupling elements and being so mounted as to be movable over said upper fifth wheel in a definite arcuate path concentric to said coupling elements during relative steering movement of the tractor and trailer, said steering member having means for non-rotating connective engagement with the complementary means in said lower fifth wheel upon relative longitudinal movement of said fifth wheels, said steering member being non-rotatably and non-slidably connected to said lower fifth wheel when assembled, a telescopic steering arm connected adjacent one of its ends to said steering member and pivotally connected to said trailer adjacent its other end, and means interconnecting said shaft and said arm so constructed and arranged that the trailer supports are turned in a direction opposite to that assumed by the tractor.

6. In a tractor-semi-trailer combination, including an upper fifth wheel, a lower fifth wheel incorporating pivotal coupling elements therebetween, one of said elements being permanently carried by said upper fifth wheel and engageable with a mating complementary element in said lower fifth wheel upon relative longitudinal movement of said fifth wheels, ground-engaging supports for said trailer, means interconnecting said supports for steering, means to steer said supports as said tractor assumes an angle with respect to said semi-trailer, said steering means including a shaft connected to and extending forwardly from the steering means, a steering member pivotally carried by said upper fifth wheel at a point removed from the vertical axis of the complementary coupling elements and being so mounted as to be movable over said upper fifth wheel in a definite arcuate path concentric to said coupling elements during relative steering movement of the tractor and trailer, said steering member having means for non-rotating connective engagement with the complementary means in said lower fifth wheel upon relative longitudinal movement of said fifth wheels, said steering member being non-rotatably and non-slidably connected to said lower fifth wheel when assembled, a telescopic steering arm connected adjacent one of its ends to said steering member behind said coupling elements and pivotally connected to said trailer adjacent its other end, and means interconnecting said shaft and said arm so constructed and arranged that the trailer supports are turned in a direction opposite to that assumed by the tractor.

7. In a tractor-semi-trailer combination, including an upper and a lower fifth wheel incorporating pivotal coupling elements therebetween, said lower fifth wheel being formed with a radial slot, said upper fifth wheel being formed with an arcuate slot rearwardly of said coupling elements and extending thereabout for more than a quarter of a circle, ground-engaging supports for said trailer, means interconnecting said supports for steering, means to steer said supports as said tractor assumes an angle with respect to said semi-trailer, said steering means including a shaft connected to and extending forwardly from the steering means, a steering member slidably mounted in the arcuate slot of said upper fifth wheel and held thereby against axial movement, said member having a steering element for engagement with the slot of said lower fifth wheel, said element being maintained in the slot of said lower fifth wheel by said arcuate slot of said upper fifth wheel, a telescopic steering arm connected adjacent one of its ends to said steering member and pivotally connected to said trailer adjacent its other end, and means interconnecting said shaft and said arm so constructed and arranged that the trailer supports are turned in a direction opposite to that assumed by the tractor.

MICHAEL A. CARMODY,